Figure 1:
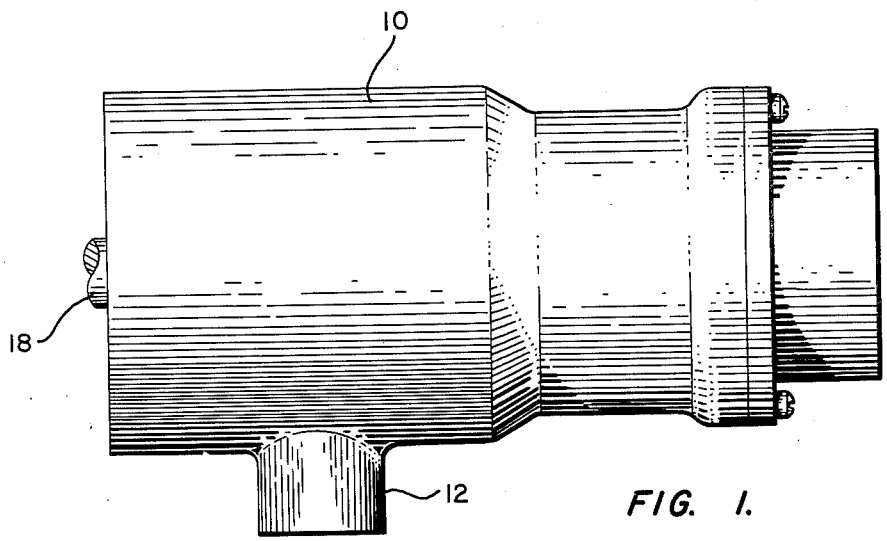

May 29, 1962 R. N. MacLEOD ETAL 3,036,558
WOBBLE PLATE FLUID MOTOR AND SINGLE VALVE MEANS
Filed June 8, 1959 4 Sheets-Sheet 1

INVENTORS
RODERICK N. MACLEOD
LUDWIG T. STOYKE
BY
Ernest L. Brown
ATTORNEY

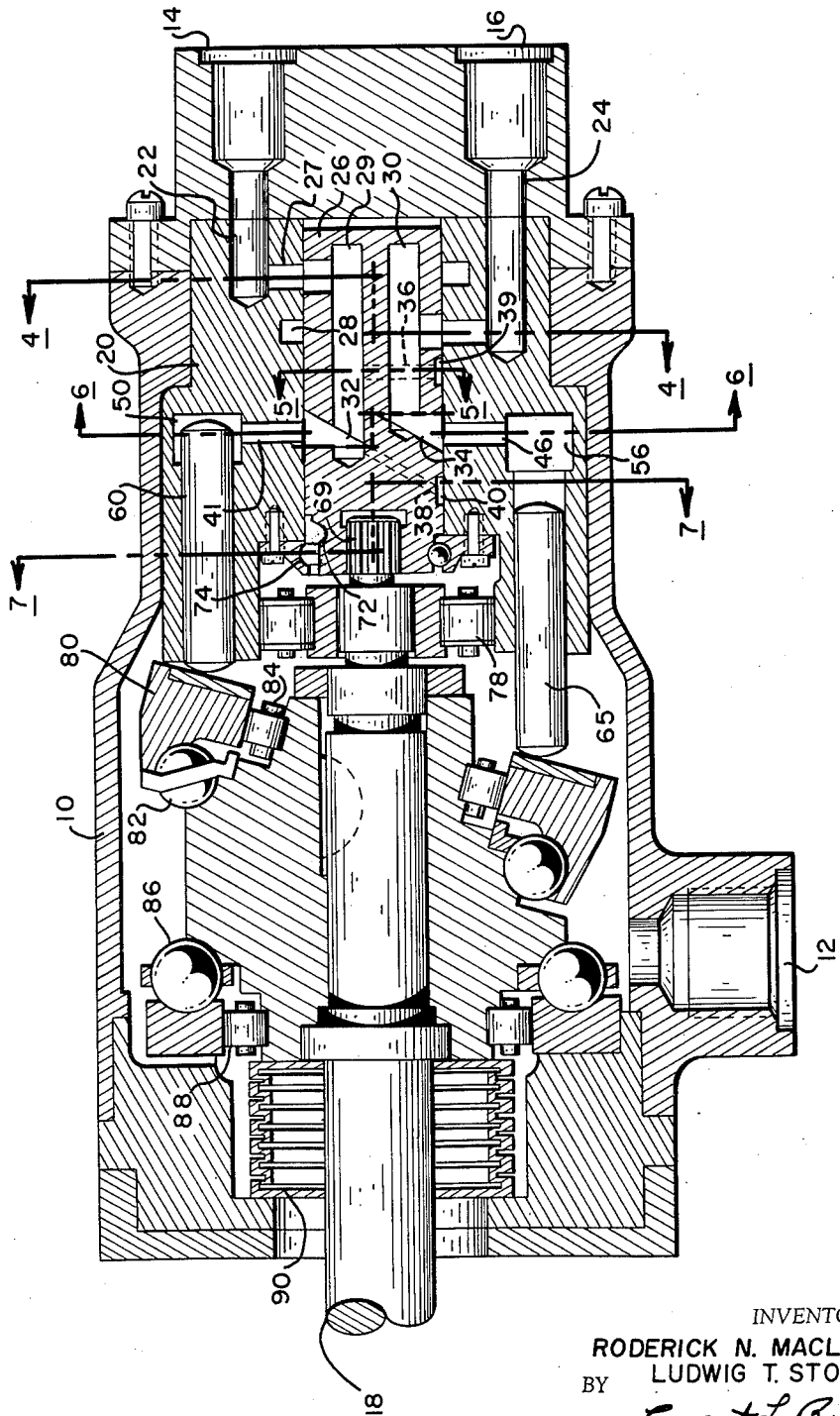

May 29, 1962   R. N. MacLEOD ETAL   3,036,558
WOBBLE PLATE FLUID MOTOR AND SINGLE VALVE MEANS
Filed June 8, 1959   4 Sheets-Sheet 3
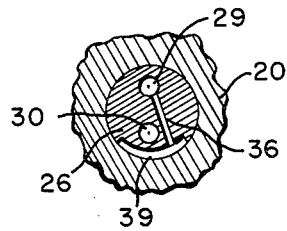
FIG. 5.
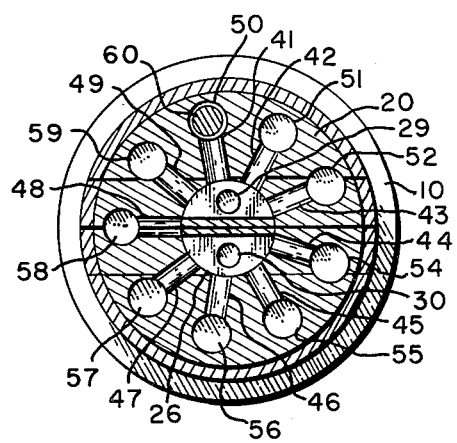
FIG. 6.
FIG. 4.
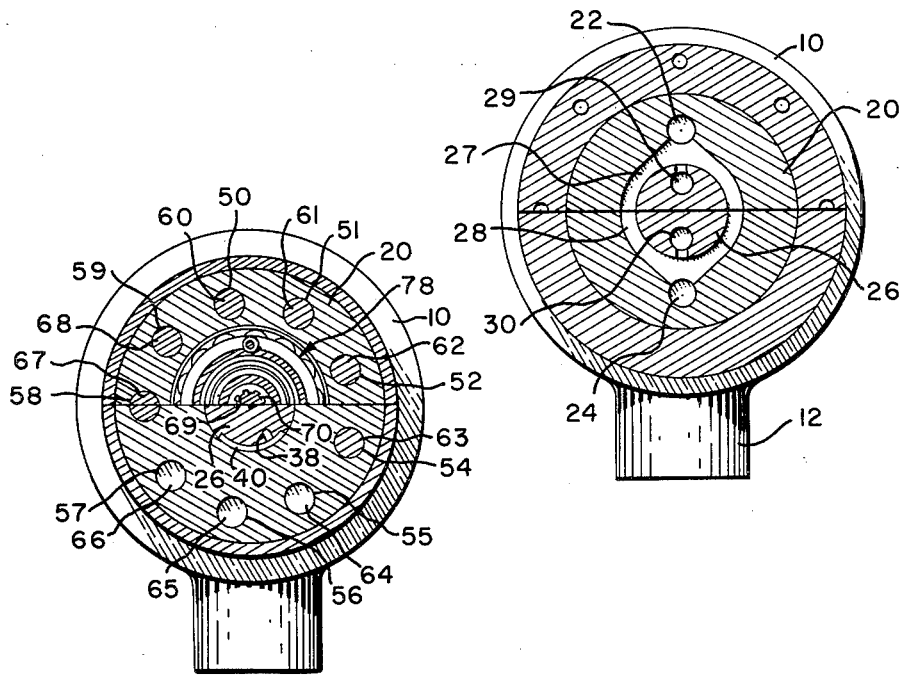
FIG. 7.
INVENTORS
RODERICK N. MACLEOD
LUDWIG T. STOYKE
BY
Ernest L. Brown
ATTORNEY May 29, 1962 R. N. MacLEOD ETAL 3,036,558
WOBBLE PLATE FLUID MOTOR AND SINGLE VALVE MEANS
Filed June 8, 1959 4 Sheets-Sheet 4

INVENTORS
RODERICK N. MACLEOD
BY    LUDWIG T. STOYKE

*Ernest L. Brown*
ATTORNEY

United States Patent Office 3,036,558
Patented May 29, 1962

3,036,558
WOBBLE PLATE FLUID MOTOR AND
SINGLE VALVE MEANS
Roderick N. MacLeod, Grafton, and Ludwig T. Stoyke,
Elyria, Ohio, assignors to Lear, Incorporated
Filed June 8, 1959, Ser. No. 818,641
11 Claims. (Cl. 121—119)

This invention pertains to a mechanical transducer, and more particularly to a transducer which is adapted to change fluid energy into mechanical energy and mechanical energy into fluid energy.

The device of this invention was originally conceived as a hydraulic motor which utilizes a hydraulic liquid as a working fluid. It is immediately apparent that, without changing its structure, fluid motors may also be driven to operate as a pump. Hence, the device contemplated by this invention may be utilized as a fluid motor or as a fluid pump without change in the basic structure.

By fluid is meant the customary scientific definition of the term, viz., liquids, vapors and gases.

The device of this invention will be described as a hydraulic motor wherein the energy is injected as fluid energy and is removed as a mechanical shaft rotation. However, it is again to be stressed that the invention is not limited to a motor nor to a device which utilizes a liquid as a working fluid.

In prior known hydraulic motors, the piston block rotates which causes the piston lubricant to be unevenly distributed. The device of this invention utilizes a stationary piston block with the working fluid, which is utilized to lubricate the pistons, forced around the pistons in a uniform distribution by virtue of the high pressure applied to the pistons.

In prior known hydraulic motors, the fluid distributing and receiving member or pintle also carries the load of the motor which causes the pintle to deflect thereby excessively wearing the pintle. The fluid distributing and receiving member of the device of this invention carries no load, so that the member does not deflect and rub against its bearing surfaces. Hence the fluid distributing and receiving member has a long wear-life.

One of the problems associated with hydraulic motors, valves, pumps, and the like, is that any dirt in the driving or working fluid tends to engage the edge of the fluid ports to cause the mechanism to score or seize. The fluid distributing and receiving member of the device of this invention has an axially oscillating motion which sweeps or cleans the fluid ports to prevent scoring and seizure.

It is, therefore, an object of this invention to provide a novel fluid-to-mechanical-energy transducer.

It is another object of this invention to provide a novel mechanical-to-fluid-energy transducer.

It is yet another object of this invention to provide a novel fluid motor.

It is still another object of this invention to provide a novel fluid pump.

It is another object of this invention to provide a novel hydraulic motor.

It is also an object of this invention to provide a novel hydraulic pump.

It is another object of this invention to provide a novel pneumatic motor.

It is yet another object of this invention to provide a novel pneumatic pump.

It is another object of this invention to provide a novel hydraulic motor which has a stationary piston block.

It is yet another object of this invention to provide a transducer wherein the fluid distributing and receiving member carries no load.

It is still another object of this invention to provide a transducer wherein the fluid distributing and receiving member has a sweeping action to clean its moving parts.

Figure 2:
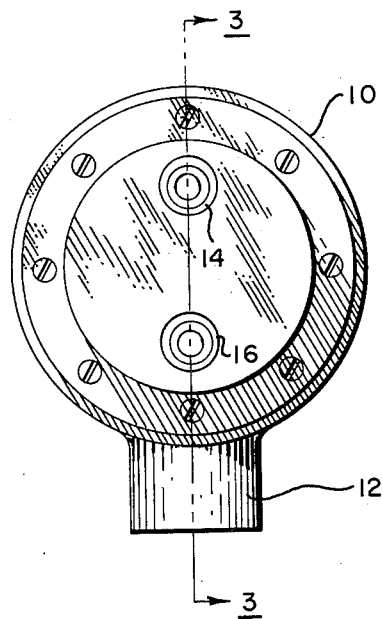
Figure 8:
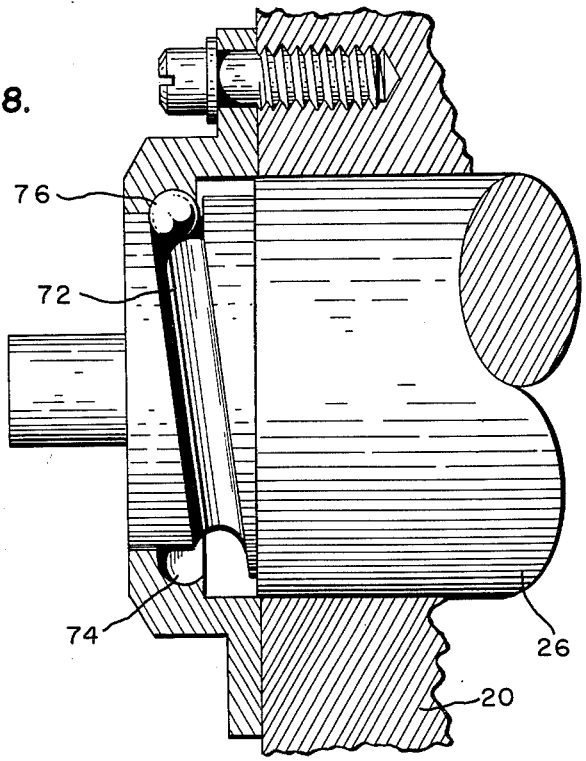
Figure 9:
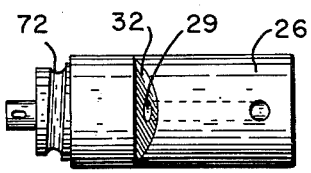
Figure 10:
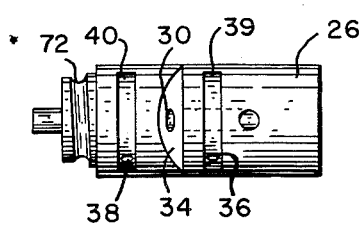

Other objects will become apparent from the following description taken in connection with the accompanying drawings in which:

FIG. 1 is a profile view of a typical transducer of this invention;
FIG. 2 is a view taken from the right in FIG. 1;
FIG. 3 is a sectional view taken at 3—3 of FIG. 2;
FIG. 4 is a sectional view taken at 4—4 in FIG. 3;
FIG. 5 is a sectional view taken at 5—5 in FIG. 3;
FIG. 6 is a sectional view taken at 6—6 in FIG. 3;
FIG. 7 is a sectional view taken at 7—7 in FIG. 3;
FIG. 8 is an enlarged view of the driven end of the pintle of the device shown in FIG. 3;
FIG. 9 is a profile view of the pintle taken from the top in FIG. 3; and
FIG. 10 is a profile view of the pintle, taken from the bottom in FIG. 3.

Referring now to the figures, and in particular to FIG. 3, shaft 18 is mounted for rotation relative to housing 10 upon bearings 86 and 88 and upon bearings 78 and 82. Wobble plate 80 is mounted upon bearings (shown generally at 82 and 84) obliquely to shaft 18 to transmit energy between shaft 18 and a plurality of pistons (shown in FIG. 7 and shown at 60 and 65 in FIG. 3).

Fluid port 14 is connected to conduit 22 in one end of piston block 20 and thence to a high pressure dispensing groove 27 in piston block 20. Dispensing groove 27 extends around pintle 26 and is generally annular in shape with an enlarged portion adjacent conduit 22 (as shown in the upper half of FIG. 4).

Fluid distributing and receiving member 26 is adapted to distribute fluid radially to the pistons in the piston block 20, to receive fluid from said pistons, and to return fluid to fluid outlet port 16. In the specific embodiment shown herein, fluid distributing and receiving member 26 is a pintle which is splined to output shaft 18 to rotate therewith.

Although the distributing member 26 is shown herein as a pintle, it is conceivable that member 26 could alternatively be a cylindrical member adapted to rotate around the outer periphery of piston block 20, to distribute fluid radially inward and to receive fluid radially outward.

Conduit 29 within pintle 26 is connected to receive fluid from groove 27 as shown in FIGS. 3 and 4. Conduit 29 is connected to a distributing port or orifice 32 which is a semi-circumferential contoured orifice, the contour of which is adapted to distribute a predetermined fluid flow to the piston conduits with which it happens to be in contact at any particular position. A preferred contour of distributing orifice 32 is shown more particularly in FIG. 9.

On the side of pintle 26 which is radially opposite groove 32, semi-circumferential grooves 39 and 40 are positioned and are connected to high pressure conduit 29 by means of conduits 36 and 38. Grooves 39 and 40 are of predetermined size, area, and positioned to pressure-balance pintle 26 so that high pressure fluid at orifice 32 does not cause pintle 26 to rub the edge of its associated cylinder. The relative position of grooves 39 and 40 and of orifices 32 and 34, as well as conduits 36 and 38, are shown in FIGS. 5, 6 and 7.

A plurality of piston members (nine shown in the specific embodiment herein) are symmetrically and circumferentially arranged about the axis of rotation of shaft 18 and pintle 26 and are adapted to reciprocate in the direction of the axis of rotation of shaft 18 against wobble plate 80. Each piston cylinder is connected by means of an associated piston conduit to receive fluid from or to expel fluid to pintle 26. The piston members, their associated cylinders, and the connecting conduits are shown in FIGS. 6 and 7.

Piston cylinders 50, 51, 52, 54, 55, 56, 57, 58 and 59 surround pistons 60, 61, 62, 63, 64, 65, 66, 67 and 68, respectively. Fluid connecting ports 41, 42, 43, 44, 45, 46, 47, 48 and 49 are connected, respectively, to said piston cylinders to receive fluid from or expel fluid to pintle 26.

Orifice 34, radially opposite orifice 32, in pintle 26 is a semi-circumferential slot with a contoured shape, adapted to receive fluid from conduits 41–49 in programmed flow, according to the position of orifice 34 relative to said conduits. Orifice 34 is connected through conduit 36 (shown in FIGS. 3 and 4) to receiving groove 28 in piston block 20. Receiving groove 28 extends around pintle 26 to receive hydraulic fluid therefrom and is of a generally annular shape with an enlarged portion adjacent conduit 24. Fluid is removed through conduit 24 and exit port 16.

Pintle 26 is connected to shaft 18 to be turned by means of splines 69 and 70. Splines 69 and 70 allow pintle 26 to move axially while still receiving torque from shaft 18. As shown more particularly in FIGS. 7 and 8, the end of pintle 26 has a bearing race 72 which is positioned at an oblique angle relative to the axis of rotation of pintle 26. The outer race 74 is connected to piston block 20 and is normal to the axis of rotation of pintle 26. Ball 76 is positioned between races 72 and 74 and is adapted to roll without slipping within the races to thereby cause pintle 26 to oscillate in an axial direction at a frequency which is one-half the frequency of rotation of shaft 18 and pintle 26.

Referring again to the means for causing pintle 26 to oscillate in an axial direction, any equivalent means for causing said pintle to oscillate axially will achieve the desired result. As an example, instead of having the plane of the outer race 74 normal to the axis of rotation while the plane of the inner race 72 is oblique thereto, the plane of the inner race 72 could be constructed normal to the axis of rotation and the plane of the outer race 74 could be oblique thereto.

If distributing means 26 were not a pintle but rather a cylinder surrounding the outer periphery of piston block 20, the cylinder could be axially oscillated by means (for example) of a pair of bearing races and a single ball in a fashion similar to that explained above.

When operated as a fluid motor (for example, a liquid motor) high pressure fluid is introduced at port 14, into conduit 29 through dispensing groove 27, thence in a predetermined timed sequence into conduits 41–49 through metering orifice 32. The fluid is thereby applied in timed sequence and pressure to pistons 60–68. The pressure applied to pistons 60–68 causes said pistons to move against wobble plate 80 to cause shaft 18 to turn. As shaft 18 turns, pintle 26 turns with shaft 18. The turning of pintle 26 causes orifice 32 to apply high pressure fluid in timed sequence to the pistons as described above. The turning of pintle 26 also exposes orifice 34 in timed sequence to conduits 41–49 to receive low pressure fluid from pistons 60–68. The low pressure fluid is expelled through conduit 30 and exit port 16.

Pressure balance on pintle 26 is maintained by means of high pressure hydraulic fluid passing through conduits 36 and 38 to grooves 39 and 40.

Oscillation of pintle 26 is achieved by virtue of the rolling of ball 76 in races 72 and 74. It is to be noted in FIG. 8 that as ball 76 rolls around the races, the races must be in register at the position of the ball. Hence, as ball 76 rolls in races 72 and 74, consecutive portions of races 72 must be aligned with race 74 causing pintle 26 to oscillate axially.

The speed of the motor is controlled by controlling the quantity of flow of the working fluid through the motor.

When the device of this invention is utilized as a pump, shaft 18 drives wobble plate 80 to cause pistons 60–68 to reciprocate in their respective cylinders. Pistons 60–68 reciprocate in timed sequence to cause low pressure fluid to be drawn inward through port 16, conduit 30, and orifice 34 and thence to be expelled under high pressure through orifice 38, conduit 29, and port 14. Again, pintle 26 is balanced by high pressure fluid from conduit 29 being introduced through conduits 36 and 38 to slots 39 and 40.

As shaft 18 turns, pintle 26 turns therewith and (by means of the oscillating mechanism described above) is caused to oscillate in an axial direction. Pintle 26 is positioned on shaft 18 to deliver low pressure fluid in predetermined sequence to pistons 60–68 and to receive high pressure fluid in a predetermined sequence in orifice 32.

The device of this invention, then, may be utilized either as a fluid motor or a fluid pump. Further, it makes no difference whether the device of this invention is utilized as a pneumatic or hydraulic device. In fact, it may conceivably be utilized with vapors.

It is to be particularly noted that the device of of this invention utilizes a fluid distributing means which does not carry a load, whereby the means is not distorted and floats freely, carrying only its own weight and whatever stresses are present due to pressure differentials. Pressure differential stresses are reduced by the pressure balancing means which was described above. The fluid distributing and receiving means of this invention, then, rotates freely without significant distortion and serves only the purpose of distributing and receiving fluid.

By keeping the piston block stationary, the pistons are not deflected in their path due to inertial forces and the like, which simplifies the problem of lubricating the piston.

The novel concept embodied in this invention of oscillating the fluid distributing and receiving member (such as fluid distributing and receiving pintle 26) clears debris from between the moving members to prevent scoring and seizure of the parts.

It is an obvious extension of the device of this invention that equivalent connecting mechanisms between the piston members and the output shaft may be utilized. For example, a crank shaft arrangement with the pistons radially actuated (rather than axially actuated as shown and described above) and a fluid distributing member external to the piston block (rather than internal as shown by pintle 26) could be utilized.

It is not intended, then, that the invention should be limited either by the description of the specific embodiment shown in the figures, nor by the description of the alternative embodiments described briefly in the specification, but only in accordance with the scope of the following claims:

We claim:

1. In combination: a housing; bearings in said housing; a shaft mounted upon said bearings for rotation relative to said housing; a plurality of piston members in a stationary piston block, said piston members connected to rotate said shaft; a non-load-carrying fluid-distributing and receiving member attached to said shaft for rotation therewith; a plurality of conduits in said piston block positioned relative to said distributing and receiving member to distribute hydraulic fluid to said piston members and to return hydraulic fluid from said piston members to said pintle with a predetermined timing sequence; and means for axially reciprocating said fluid-distributing and receiving member to sweep said ports between said distributing member and said piston block.

2. In combination: a housing; bearings in said housing; a shaft mounted upon said bearings for rotation relative to said housing; a plurality of piston members in a stationary piston block, said piston members connected to rotate said shaft; a non-load-carrying fluid-distributing and receiving member attached to said shaft for rotation therewith; a plurality of conduits in said piston block positioned relative to said distributing and receiving member to distribute hydraulic fluid to said piston members and to return hydraulic fluid from said piston members with a predetermined timing sequence; means for pressure balancing said fluid distributing and receiving member; and means for axially reciprocating said fluid distributing and receiving member to sweep said conduits between said distributing and receiving member and said piston block.

3. In combination: a housing; bearings in said housing; a shaft mounted on said bearings for rotation relative to said housing; a plurality of piston members in a stationary piston block, said piston members connected to rotate said shaft; a non-load-carrying fluid distributing and receiving pintle attached to said shaft for rotation therewith; a plurality of conduits in said piston block positioned relative to said pintle to distribute hydraulic fluid to said piston members and to return hydraulic fluid from said piston members to said pintle with a predetermined timing sequence; and means for axially reciprocating said pintle to sweep said conduits between said pintle and said piston block.

4. In combination: a housing; bearings in said housing; a shaft mounted on said bearings for rotation relative to said housing; a plurality of piston members in a stationary piston block, said piston members connected to drive said shaft; a non-load-carrying fluid-distributing and receiving pintle attached to said shaft for rotation therewith; a plurality of conduits in said piston block positioned relative to said pintle to distribute hydraulic fluid to said piston members and to return hydraulic fluid from said piston members to said pintle with a predetermined timing sequence; means for pressure balancing said pintle; and means for axially reciprocating said pintle to sweep said conduits between said pintle and said piston block.

5. In combination: a housing; bearings in said housing; a shaft supported by said bearings for rotation relative to said housing; wobble plate means positioned on and attached to said shaft; piston means engaging said wobble plate means; a pintle attached for rotation to said shaft and having axial freedom; said pintle and said housing having a first and second ball bearing race thereon, one of said races being in an oblique plane relative to the axis of said shaft and the other of said races being in a plane normal to the axis of said shaft; a single ball positioned to roll without slipping between said races to thereby axially reciprocate said pintle; said pintle having contoured orifices thereon connecting with said pistons to supply fluid to said pistons and to receive fluid from said pistons in predetermined timing sequence.

6. A device as recited in claim 5 and further comprising means for pressure-balancing said pintle.

7. In combination: a housing; a shaft; a first pair of bearings positioned to mount said shaft relative to said housing; a wobble plate attached to said shaft; a stationary piston block including a plurality of piston cylinders positioned within said piston block; a plurality of pistons equal in number to said cylinders positioned in said cylinders to said piston block to slide in an axial direction relative to said shaft, and symmetrically disposed about the axis of said shaft to engage said wobble plate; a plurality of fluid conduits in said piston block positioned one to each said piston to conduct fluid into and out of said piston cylinders; a pintle attached to said shaft and rotatably mounted relative to said piston block upon bearings; said bearings having an outer race in said piston block which is positioned normal to the axis of rotation of said pintle, and said bearings having an inner race on said pintle which is positioned at an oblique angle relative to the axis of rotation of said pintle thereby providing said pintle with limited axial movement; a fluid inlet duct within said pintle connected to receive fluid and distribute said fluid to said conduits in predetermined timing sequence; a second conduit positioned within said pintle to discharge fluid from said conduits in a predetermined timing sequence.

8. A device as recited in claim 7 and further comprising: conduit means leading from said fluid inlet duct to the side of said pintle radially opposite said fluid inlet duct, including grooves of predetermined size, area and position to pressure-balance said pintle.

9. In combination: a motor housing; a shaft; a first pair of bearings positioned to mount said shaft relative to said housing; a wobble plate attached to said shaft; a stationary piston block including a plurality of piston cylinders positioned within said piston block; a plurality of pistons positioned in said cylinders of said piston block to slide in an axial direction relative to said shaft, and symmetrically disposed about the axis of said shaft to engage said wobble plate; a plurality of fluid conduits in said piston block positioned one to each said piston to conduct fluid into and out of said piston cylinders; a rotatable pintle mounted upon bearings relative to said piston block, said pintle being attached to said shaft for rotation therewith and having freedom for limited axial movement; a fluid inlet duct within said pintle connected to receive fluid and to distribute said fluid to said conduits in predetermined timing sequence; a second conduit positioned within said pintle to discharge fluid from said conduits in a predetermined timing sequence; a pair of bearing races, one mounted on said pintle and the other mounted on said piston block, one said race being in a plane normal to the axis of said shaft, the plane of the other said race being in an oblique angle relative to said shaft; and a single ball positioned between said races for axially reciprocating said pintle.

10. A device as recited in claim 9 and further comprising: conduit means leading from said fluid inlet duct to the side of said pintle radially opposite said fluid inlet duct, including grooves of predetermined size, area and position to pressure-balance said pintle.

11. The device as claimed in claim 1 wherein said non-load carrying fluid distributing and receiving member is a pintle and said pintle has a first set of grooves of predetermined size and area so that when said pintle is under fluid pressure, it is pressure balanced, and a semi-circumferential contoured orifice for distributing and receiving fluid in a controlled manner.

References Cited in the file of this patent

UNITED STATES PATENTS

| 1,299,477 | Kendall | Apr. 8, 1919 |
| 2,169,456 | Wahlmark | Aug. 15, 1939 |
| 2,246,074 | Joy | June 17, 1941 |
| 2,861,552 | Creighton et al. | Nov. 25, 1958 |

FOREIGN PATENTS

| 218,061 | Great Britain | July 3, 1924 |